United States Patent [19]
Hudson

[11] 3,848,302
[45] Nov. 19, 1974

[54] MOUNTING FOR TOOL BITS
[76] Inventor: Arthur Franklin Hudson, Box 1025, Huntington, Ind. 46750
[22] Filed: July 31, 1972
[21] Appl. No.: 261,633

Related U.S. Application Data
[63] Continuation of Ser. No. 173,528, Aug. 20, 1971, abandoned.

[52] U.S. Cl. .............................................. 29/96
[51] Int. Cl. .......................................... B26d 1/12
[58] Field of Search ............. 29/96, 105, 105 A, 97

[56] References Cited
UNITED STATES PATENTS

| | | | |
|---|---|---|---|
| 2,037,642 | 4/1936 | Schribner | 29/105 |
| 2,619,010 | 11/1952 | Mathison | 29/96 X |
| 2,799,079 | 7/1957 | Brigner, Jr. | 29/96 |
| 2,900,704 | 8/1959 | Sweet | 29/97 |
| 3,109,452 | 9/1963 | Greenleaf | 29/96 |
| 3,124,865 | 3/1964 | Clark et al. | 29/96 |
| 3,144,795 | 8/1964 | Bunnell | 29/96 X |
| 3,216,086 | 11/1965 | Kryszek | 29/96 |

Primary Examiner—Harrison L. Hinson

[57] ABSTRACT

I propose an adjustable mounting for tool bits which includes a pocket of a size which can be adjusted in order to position the tool bit, this being by means of a movable element within the pocket in the form of a wedge which provides one locating surface for the tool bit, and additional locating surfaces for the tool bit which will provide a back-up for the tool bit regardless of its adjusted position whereby the tool bit is held against movement in its adjusted position, and a hold down device which retains the tool bit within the pocket at its desired position.

1 Claim, 15 Drawing Figures 3,848,302
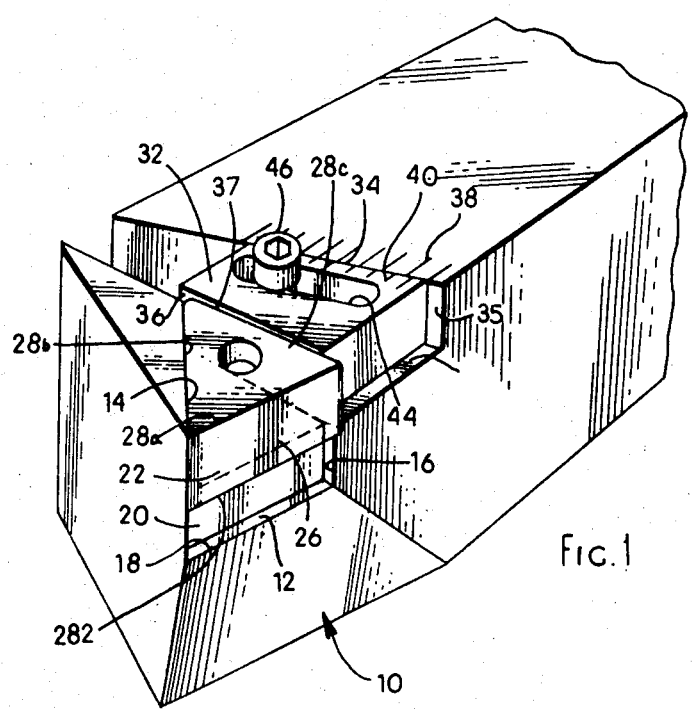
Fig.1
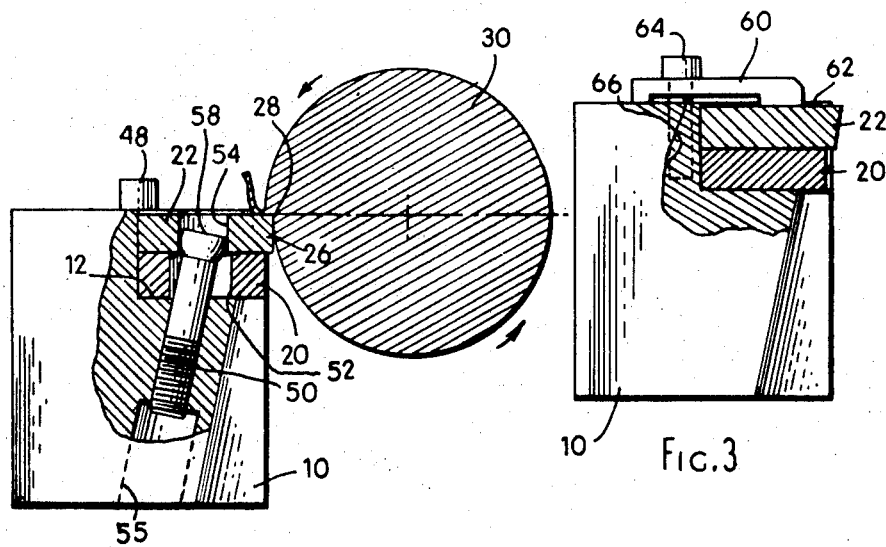
Fig.2
Fig.3

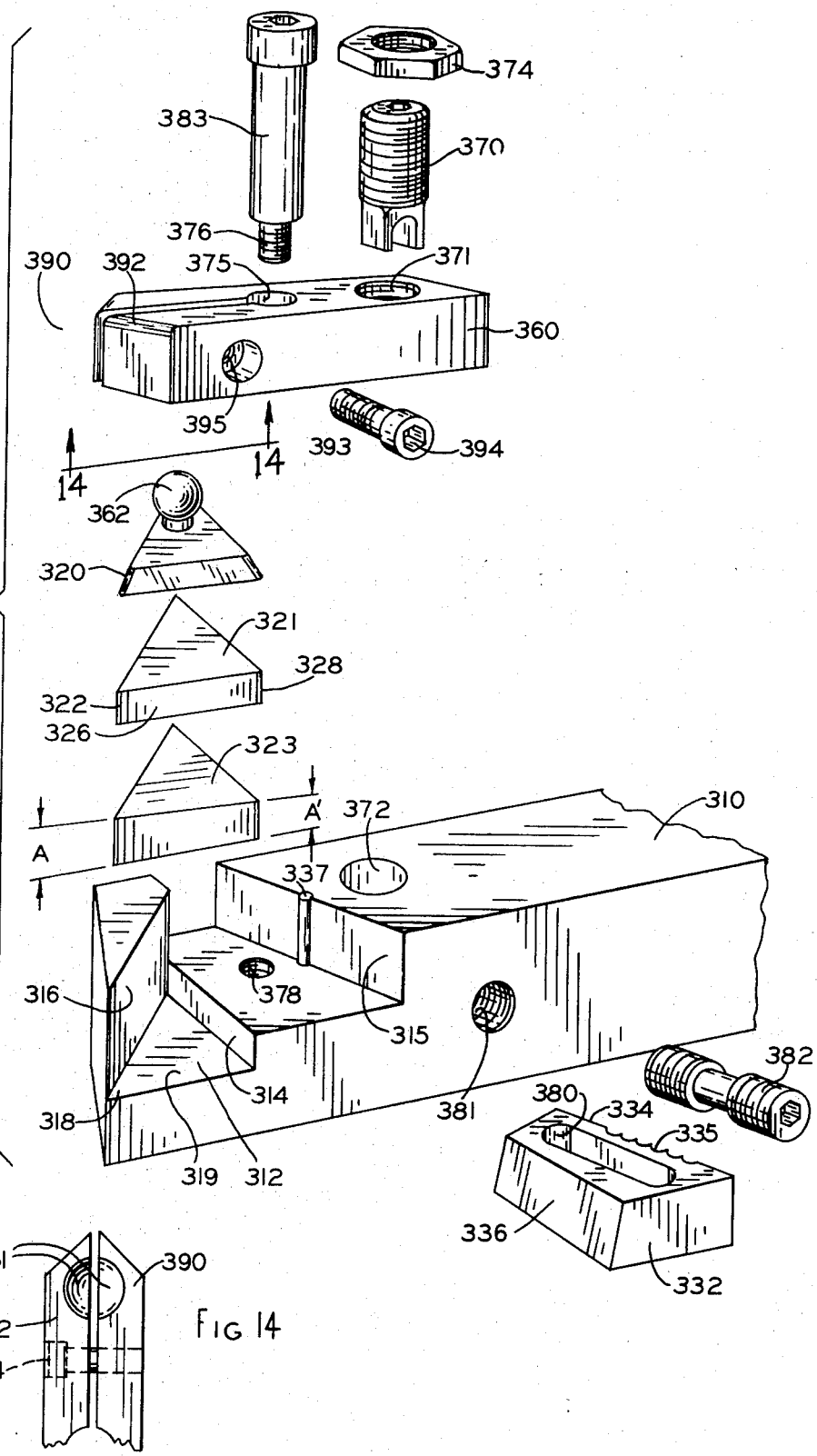

MOUNTING FOR TOOL BITS

This Application is a continuation in whole application of Aruthur Franklin Hudson, Ser. No. 173,528 filed Aug. 20, 1971, entitled "MOUNTING FOR TOOL BITS" and now abandoned.

This invention relates to an improvement mounting for tool bits in metal and nonmetal processing tools as cutter, planers, boring devices, reamers, etc., and more particularly this invention relates to a new and improved mounting wherein the tool bit can be positioned easily and precisely at the desired working position.

Both the metal and nonmetal working arts have long been aware of the need for properly positioning wearable tool bits. Some of the advances in this respect are shown in my previously issued U.S. Pat. Nos. 2,903,781 and 2,808,637. While the art has successfully met the requirement for positioning the working bit at the proper working angle, it has not been successful in readily positioning the tool bit at the correct advance or retractile position with respect to the workpiece. It is desirable that the tool bit be properly located and this necessitates an adjustment to compensate for wear of the bit. In order therefore, for the tool to be of maximum service, there must be provided means for quickly and accurately positioning a tool bit on a tool holder, taking into account the requisite working angle and, also, the optimum projected position of the work bit. This last consideration requires adjustment from time to time owing to wearability and/or sharpening from inherent abrasion and also from sharpening of the bit when one or the other of its working surfaces are worn.

In a brief review of the metal cutting tool art, tools have been provided which include various alloys of tungsten, vanadium, chromium, cobalt, etc. These high speed tools were to a great extent replaced by tool bits having tungsten carbide which was brazed or silver-soldered onto soft steel shanks.

Eventually such brazed tools were in turn replaced to a considerable extent by pieces of carbide of relatively small size which were clamped in a tool holder. The art then progressed to the usage of a "clamped slug" type of tool and holder and this was later replaced by tool shanks having a recess machined in one end and a relatively thin piece of carbide clamped or otherwise suitably secured within such recessed pocket. It was a common practice to make this carbide tool bit of square, triangular or other regular geometrical shape and having working edges. When one corner of the tool bit was worn the tool bit was indexed to bring a new working edge into position and thereafter clamped in place for use. After all of the edges were worn, it was the practice then to discard the tool bit and therefore they came to be called "throw-away" tool bits.

There has now developed within the art efficient and accurate grinding equipment which can regrind the working edges of the throw-away tool bits and it is possible to regrind such edges to a new accuracy and such edges can be reused. Since, however, the tool bit is reduced in size it is necessary to adjust the position for the reground tool bit with an accuracy which takes into account the loss of material produced because of the regrinding operation. The regrinding procedure has given rise to a need for a tool holder having the capabilities of accurately disposing the reground tool bit and the present invention intends to fill that need. The present invention proposes to use a reducible size pocket wherein the tool bit can be mounted and to position such bit within the pocket with a substantial degree of accuracy and to hold the tool bit in its adjusted position with a considerable degree of backup strength so that the adjusted position is not changed during use. The present invention further proposes to solve the problem of reusing reground tool bits by utilizing a reducible size pocket which can quickly, easily and accurately vary in pocket size so that a tool bit can be accurately located therein in any one of its multiple cutting edge positions in order that all of the reground cutting edges can be advanced by the same amount. Thus, the problem of accurate reuse of a reground tool is effectively solved by the present invention.

According to the foregoing, it is one of the principal objects of the present invention to utilize a tool holder having a reducible pocket for receiving a tool bit which can be accurately positioned in order to present any one of its working edges into operative position and wherein the reducible size pocket can be adjusted to compensate for reduction in size of the tool bit when the tool bit edges are reground so that following regrinding the pocket can be quickly, accurately and conveniently changed in size by the necessary amount to compensate for the change in size of the reground tool bit edges. Consequently there is a substantial saving in bit manufacture because instead of discarding the worn tool bit such tool bits can be reground and reused without sacrifice in accuracy of operation or speed of operation by reason of the added use of the reground bits.

Accordingly, it is one of the principal objects of the present invention to provide a composite means for adjustably defining the optimum position of the tool bit on the work holder.

It is a further object of the present invention to provide a readily adjustable tool bit positioning means which can readily define both the attitude of the tool bit and, also, the extended or retracted position of the tool bit. The present invention also enables the combination of a gage with such adjustable clamping means to readily provide information concerning the positioning of the tool bit.

It is another important feature of the present invention that the tool bit can be readily located in its working position and adjusted to compensate for wear and other dimensional variances, and once such adjustment is made the tool bit is securely clamped in place at its desired position.

A further important feature of the present invention is that a tool bit incorporating multiple adjustments can be incorporated into a tool holder in combination with a wide variation of metal processing tools including, but not limited to, turning tools, planing tools, threading tools, rotating (angular cutting), rotating side cutting or rotating and cutting. Also, the tools can be at right angle and can either reciprocate or rotate, and be fixed or movable.

Other objects and features of the present invention will become apparent from a consideration of the following drawings, wherein:

FIG. 1 is an enlarged isometric detail view of a tool holder having the invention incorporated therein;

FIG. 2 illustrates the clamping means for holding the work bit within the seat of the tool holder;

FIG. 3 illustrates a somewhat different arrangement for clamping the work bit in place within the seat of the tool holder;

FIG. 13 is an exploded view of a still further embodiment of the present invention; and, FIG. 14 is a view of the undersurface of the clamping member.

Figure 4:
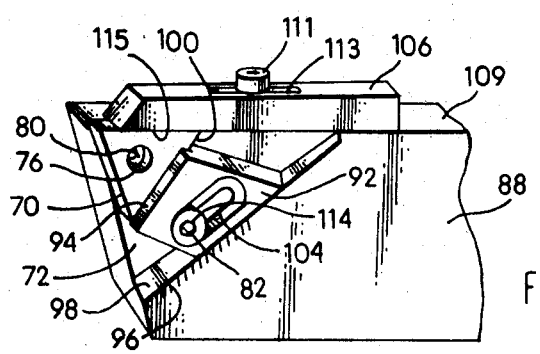
FIG. 4 is an isometric view of a further arrangement for adjustably positioning and clamping the work bit within the seat of a tool holder.

Referring now to the drawings, a tool holder designated generally by reference numeral 10 includes a pocket 12 which is milled out of the end of the tool holder and includes a fixed side 14 and a second fixed side 16, these two faces converging at a preferred angle.

Also, within pocket 12 is a flat, or substantially flat, base 18 whereon is mounted replaceable support plate 20 whose opposite faces can be pitched at a preferred angle defining the attitude of a tool bit 22 which is supporting thereon. The purpose of locating the tool bit 22 at a preferred angle is that its working face 26, including working edge 28, should engage workpiece 30 at the most desired angle. For the signifiance of this angle as far as friction, cleanness of cut, etc. is concerned, reference may be made to my previously issued U.S. Pat. No. 2,903,781, which discusses in full the need for a preferred angle of the tool in order to obtain optimum wear life and machine operating condition. The opposite faces of the support plate 20 are contoured so that the angle of the tool bit can be selectively obtained according to how the support plate 20 is positioned on the flat surface 18.

The extended and retracted position of the tool bit is defined by a tapered block adjuster 32 having inclined tapered faces 34 and 36 engaging faces 35 and 37 on the tool holder and tool bit respectively. The tapered block adjuster 32 can be moved back and forth to vary the size of the pocket between face 36 and 35 and thus by changing this pocket size the triangular tool bit 22 is adjusted outwardly or inwardly within the pocket 12. The size of the pocket is determined by the position of the tapered block adjuster 32 and the configuration of its tapered sides 34 and 36 or faces as previously indicated. These parameters are calibrated in relation to a vernier scale 38 on the tool holder 10 and a vernier scale 40 on the tapered block adjuster 32 so that the position of the tool bit 22 can be read from the position of the tapered block adjuster 32. The described back and forth movement of the tapered block adjuster 32 is obtainable because an elongated slot 44 permits the tapered block adjuster 32 to move past a cap screw 46 threadedly received within the tool holder 10 and clamped in place by means of a suitable wrench which tightens the cap screw down and holds the tapered block adjuster 32 at a preferred location which from the vernier scale reading will accurately define the position for the tool bit.

The tool bit in turn is clamped at the position defined by tapered block adjuster 32 and the support plate 20 (FIG. 2) by means of a ball cap screw 50 which passes through an opening 52 of support plate 20 and into a socket opening 54 of the tool bit 22. End 58 forms a half ball, or other suitable configuration, and is received within the opening 54 permitting the ball cap screw 50 to urge the tool bit 22 downwardly against support plate 20 and hold it within seat 12 while at the same time permitting the tool bit to assume whatever attitude is defined by the support plate 20. Thus, the tool bit is accurately and readily positioned in its numerous difference aspects for optimum tool working operation and is thereafter fully and reliably clamped in place.

Referring to FIG. 2, there is a major force from the workpiece 30 which is directed radially against the bit forcing it firmly into pocket 12.

The cutting edge 28 of the tool is wearable and must be reground and the bit repositioned from time to time to compensate for the loss of dimension from wear and regrinding. This is accomplished by loosening the screw 46 and moving the tapered block adjuster 32 to whatever position is necessary for repositioning the bit 22 outwardly within pocket 12 to its proper working position wherein edge 28 is in proper relation to the workpiece, at which point the tapered block adjuster 32 is again clamped by turning down the screw 46. The tapered block adjuster cannot accidentally move changing the size of the pocket. The tool bit 22 is removed from the pocket and rotated, bringing one or the other of its working edges 28a, 28b and 28c, (if triangular, as shown) into operative position, first, by loosening screw 50 and indexing the tool bit rotatably and then, if turn over type, turning the tool bit over so that the other of the edges of the opposite face are brought into operation. In other words, the tool bit, if turn over type, is turned over so that the faces which are disposed upwardly in FIG. 1 are brought against support plate 20 and in that position any one of the opposite edges is brought into operative position.

After these edges are worn it has been the previous practice to discard the tool bit; but under the practice of the present invention, the edges are reground and the tool bit is repositioned by making the pocket for the tool bit of a reduced size and thereby compensating for the loss of material which occurs during the regrinding operation. The loss of material effected by the regrinding operation is compensated for by reducing the size of the pocket and correspondingly adjusting the tool bit outwardly so that its reground working edge is at the same operative position indicated in FIG. 2. This is accomplished by loosening the screw 50 and causing the tapered block adjuster 32 to move inwardly by whatever amount is necessary to reduce the size of the pocket offsetting the loss of material from the regrinding operation.

In the present invention, however, greater utility is realized from the tool bit and therefore greater economies are effected in metal processing operation. Previous to the present invention the few adjustable tool bit holders being marketed were not widely accepted because there was lacking a readily operable tool holder which could quickly, easily and accurately reduce the pocket size to compensate for the loss of material inherent in regrinding operation. Owing both to the fact that there exists apparatus for quickly and efficiently regrinding the tool bit and by reason of the present invention which is capable of accurately disposing the reground tool bit in operation, many economies are possible because of the greater utility from a given tool bit.

When the pocket size for the tool bit is adjusted, the tool bit is held in its operative position not only with accuracy but with a considerable degree of strength as well. Because the tool bit is held with equal strength in the newly adjusted position, the same as in the original position, the machining operation is performed just as accurately and as reliably and without deviation because of accidental change in position. In other words, once an adjustment is made to compensate for the reground tool bit, the tool bit is held firmly and accurately in place and is not accidentally dislodged or changed in position during use. These results are obtainable by reason of the present invention which utilizes a reducible pocket for the tool bit which not only provides a substantial variation for change in size of the reground tool bit but also provides through use of a vernier type scale reading, an accurately defined position for the tool bit as previously described. The tool bit once clamped in place cannot move away from the workpiece 30 (FIG. 2) nor can it move angularly (FIG. 1) within the mounting pocket and is further prevented from moving upwardly out of the pocket. The tool bit is prevented from any movement relatively to the pocket because it is securely held in place by the described clamp arrangement. During repositioning of the tool bit the screw 50 is backed out from holder 10 to release the tool bit and the tool bit's position may be repositioned as desired. In this manner the tool bit is accurately positioned and then clamped in place. If desired, the clamping screw 50 can be replaced by an overlying clamp arm 60 (FIG. 3), which is urged against face 62 of the work bit 22, which takes its planar position from the support plate 20. The arm 60 adjusts itself to whatever angular position is assumed by the tool bit 22, as taught in my previously issued U.S. Pat. No. 2,903,781, but accidental movements are prevented by a clamping bolt 64 which passes into a threaded opening 66 in the head 10 to clamp the tool bit 22 at its proper angular position defined by support plate 20, the same as in the previous embodiment and at a planar position defined by support plate 20, the same as in the previous embodiment.

Figure 5:
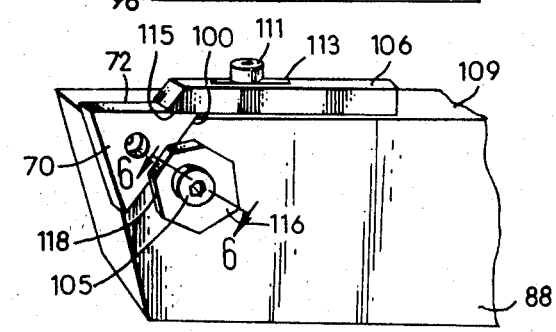
FIG. 5 is a further embodiment of the invention in which the positioning means is varied from a wedge to a multiple flat shaped means which serves as a series of fixed gauges defining the extended and retracted positions of the tool bit.

Referring next to FIGS. 4 and 5, in this embodiment, the tool bit is received within a pocket 72. The tool bit has an opening 76 into which is passed a conical head 80 of a threaded clamping screw which is passed into a threaded opening in holder 88 thereby urging the tool bit against pocket 72. The conical head 80 permits the tool bit 70 to move outwardly or inwardly within the pocket 72, depending upon the position of tapered block adjuster 92. The tapered block adjuster 92 has tapered faces 94 and 96 engaging tapered face 98 on the holder 88 and face 100 on the tool bit. By sliding the tapered block adjuster in one direction or the other it is possible to vary the position of the tool bit within the pocket of a desired position and the tool bit is then clamped by means of the threaded screw 82. The described relative movement of the tapered block adjuster 92 is permitted by the elongated opening 104 through which is passed screw 82 threadly received in holder 88 the same as in the previous embodiment. Once the tool bit is properly placed the screw 82 is screwed down. The tool bit is further retained by a sliding chipbreaker 106 which is secured to edge 109 by a cap screw 111 received through oversize opening 113 and permitting the end 115 to engage the upper surface of the bit 70.

Figure 6:
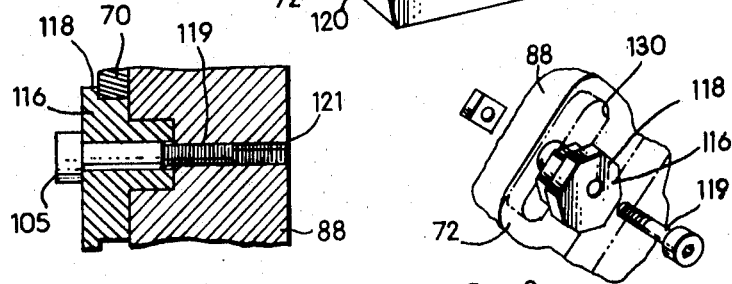
FIG. 6 is a section view taken on line 6—6 of FIG. 5.
Figure 8A:
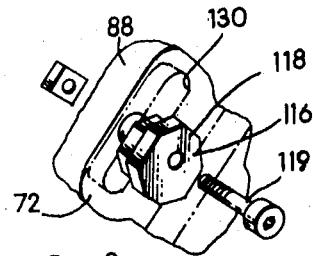
FIG. 8A is an isometric exploded view showing in detail view the attachment of the tool bit onto the tool holder.

Referring next to FIG. 5, the polygon adjuster 116 can replace the tapered block adjuster 32. The polygon adjuster is comprised of an eccentric 116 having polygon faces 118, one of which is caused to selectively bear against the face 100 of bit 70 which is received within a pocket 72, the same as in the previous embodiment. The eccentric is rotated on shoulder screw 105 and is then clamped at a preferred position by turning the screw 119 down into threaded opening 121 in holder 88 (FIG. 6).

Figure 7:
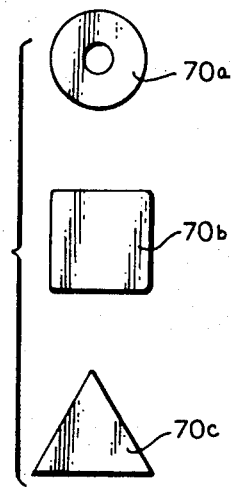
FIG. 7 illustrates various typical tool bit shapes including circular, square and triangular.

Referring now to FIG. 7, the tool bit can be circular as indicated by reference numeral 70A and received in a work pocket, and have linear engagement with surfaces 16 and 36 as indicated in FIG. 1. The tool bit can be square, as indicated by reference numeral 70B or the tool bit can be triangular as indicated by reference numeral 70C, or other desired shapes in the manner previously described.

Figure 8:
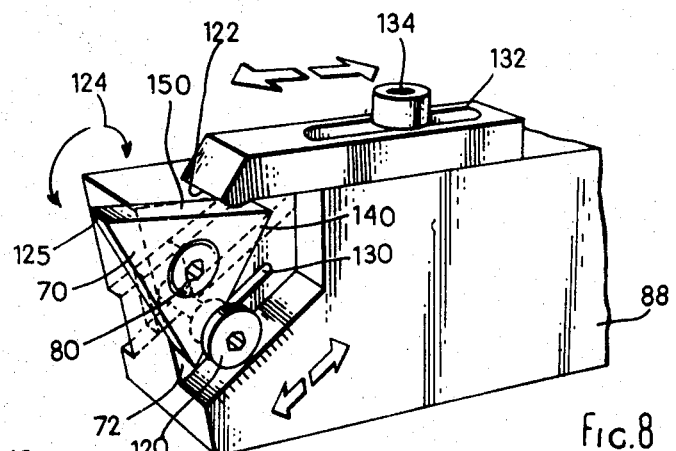
FIG. 8 is an isometric view of a further positioning means defining the attitude, the extended and retracted position of the tool and the angular position to which the tool is turned at the time it effects its working.

Referring now to FIG. 8, the bit 70 can be adjusted in the pocket 72 of the holder 88 by a pair of adjustable stops 120 and 122 which serve in addition to defining the position within the pocket 72, the further function of defining the angularity of the bit, i.e., it is accurately positioned about axis 124 which determines the angle at which the work bit engages the workpiece. In this embodiment, the tool bit is received within a seat 70 the same as in the embodiment of FIG. 5 and its retracted or advanced position is determined by suitably positioning stop 120 within elongated opening 130 and stop 122 is moved relatively to the holder 88 by slipping the elongated opening 132 past screw 134. The bit 70 is advanced or extended by moving the two stops closer together or by moving the two stops farther apart. The angular position of the bit 70 is obtained by advancing or retracting one or the other of the stops, to vary the point of contact between stop 120 and surface 140 of the bit 70 or by varying engagement of stop 122 with side 150 of the bit 70. Once the extended or retracted position of the bit is determined, as well as its angular position, the stops 120 and 122 are clamped in place and the bit 70 is then secured within the seat by means of a screw 80, received through a socket opening 160 which permits the described adjustable movements and then holds the bit in place.

Figure 9:
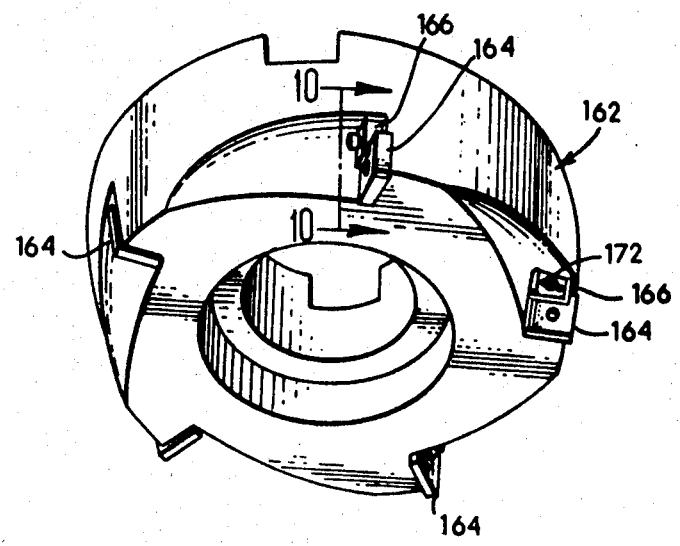
FIG. 9 is an isometric view of a rotatable cutter head having a plurality of tools positionable in accordance with the present invention.

Referring next to the embodiment in FIG. 9, a cutter head designated generally by reference numeral 162, has spaced around its periphery a number of tool bits 164 which are positioned relatively to the rotatable cutter head, each by means of an associated tapered block adjuster 166. The tool bits are adjusted within pockets 168 by means of the tapered block adjuster 166, (FIG. 10) movable along coacting inclined surface 170 and then secured by a screw 172, the same as in the previous embodiment. Once the bit 164 is located, it is held in place within the pocket by means of a screw 174 (FIG. 11) the same as in the previous embodiments.

Figure 10:
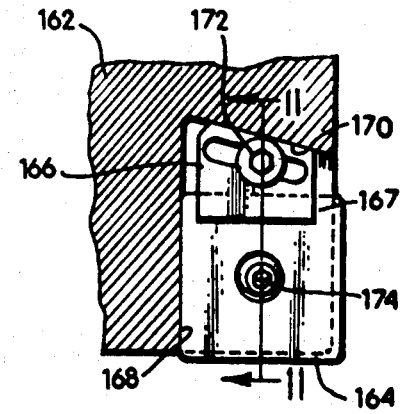
FIG. 10 is a detail view looking in the direction of the arrows 10—10 of FIG. 9.
Figure 11:
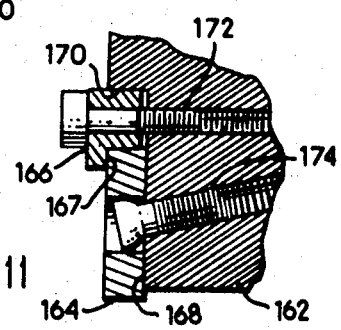
FIG. 11 is a section view taken on line 11—11 of FIG. 10.

The bit 164, referring to FIG. 10, is adjusted angularly and held by an overlapping lip 167 (FIG. 11) which presses the bit 164 against pocket 168. Clamping screw 174 holds the assembly together against pocket 168 as described. The cutter head 162 is thus operated after the plurality of bits 70 are suitably positioned.

Figure 12:
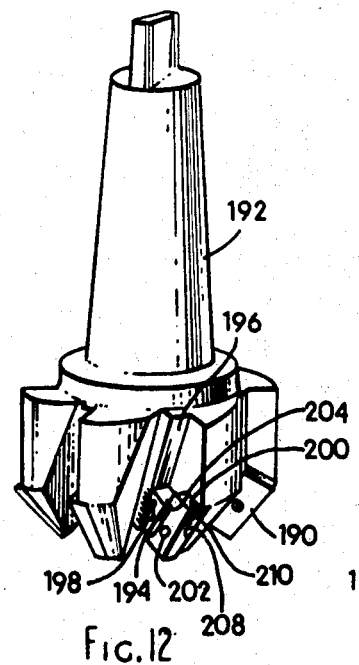
FIG. 12 illustrates how the invention is incorporated into a rotatable angular cutting tool.

Referring to FIG. 12, a plurality of tool bits 190 are suitably disposed around the periphery of a counterboring tool 192, these tool bits 190 being positioned by tapered block adjusters 194 which are movable along the surface 196 and are then clamped in place by screw 198. In this way the tool bit is adjusted within pocket 200 and is then held in its adjusted position by a screw 202. The tapered block adjuster 194 may include an overhanging lip 204 to assit in holding the tool bit in place. The tool bit is "backed up" within the pocket by resting against surfaces 208 and 210 as well as engaging the confronting surface of tapered block adjuster 194.

Referring next to the embodiment of FIGS. 13 and 14, there is provided a tool holder designated generally by reference numeral 310 having a pocket 312 which is milled out of the end of the tool holder and includes two relatively fixed sides 314 and 316 which converge at a preferred angle. A substantially flat base 319 may also be provided at a preferred pitch or angle to control the working position for the tool bit 322 which lies on top of an anvil 323 located within the pocket 312 so hat its working face 326 and working edge 328 can be disposed at a proper working angle.

The position for the tool bit 322 is defined in part by a tapered block adjuster 332 which has tapered faces 334 and 336 which engage fixed side 315 and a confronting side of tool bit 322 to define its operative position. Along the tapered face 334 are a plurality of semicircular cross section notches 335 which coact with a pin 337 to determine the position of the block adjuster 332 and thereby determine the in-and-out operative position of the tool bit 322.

The operative position for the tool bit is maintained in part by a clamping member 360 having hemispherical recess portions 361 which engage with a ball 362 on a clamp plate 320 which bears against and clamps the tool bit 322 in place. The clamp plate 320 can adjust to any angular position required in accordance with the pitch of the confronting face 321 on the tool bit 322.

A clamping member 360 overlies the clamp plate 320 and is clamped in place by a bolt 370 which is passed through a threaded opening 371 of the clamping member 360 and then into threaded opening 372. A nut 374 is then used to hold the clamping bolt 370 in place.

A shoulder screw 383 is passed through an opening 375 and the threaded end 376 is received within a threaded opening 378 to urge the clamping member 360 downwardly against the adjuster block 332 while at the same time permitting necessary adjustable movement of the adjuster block by reason of the elongated opening 380 which permits the adjuster block to move relatively to side support 315 and thereby define the position for the tool bit 322. The position for the wedge adjuster 332 once established, assists in holding the tool bit 322 in place together with a combination of the bolt 370 and shoulder screw 383, the bolt 370 being located by a locking member 382 which passes through a threaded opening 381 of the tool holder to hold it in place.

Further adjustable swiveling movement of the clamp 320 once it has accommodated itself to the tilt of the tool bit is thereafter prevented from further movement by means of drawing the two split ends 390 and 392 together with a threaded lock member 393 having an interior hex socket 394 for facilitating turning by a tool provided for that purpose. The locking member 393 is received through threaded openings 395 in the split ends 390, 392 thus pulling the ends together and thereby drawing complementary spherical seats 361 against the ball 362 and preventing further swiveling movement. Once an adjusted position is obtained for the tool bit 322 further movement on its seat is effectively prevented.

Likewise when it is time to adjust the tool bit either by moving it into or out of the pocket or varying its pitch or presenting a new working edge, all that is required is to loosen bolt 360, stem 383, locking member 382, and effect whatever adjustment is required for the tool bit and thereafter turn down bolt 370, shoulder screw 383, locking member 382 to hold the adjuster block 332 and tool bit 322 and anvil 323 at its new position.

For example, if it is desired to move the tool bit outwardly, then the adjuster block 332 is moved farther inwardly with the semi-circular notches 335 ratcheting over the pin 337 and once the proper position for the wedge block is obtained, determining the position for the tool bit, the wedge block position is fixed by being confined against the face 315 with the pin 337 entering into one of the recesses 335. The adjuster wedge block 332 is effectively prevented from accidental movement by means of clamp 360. The tool bit is therefore held fixedly in its designated position.

Although the present invention has been illustrated and described in connection with a plurality of example embodiments, it will be understood that these are illustrative of the invention and are by no means restrictive thereof. It is reasonably to be expected that those skilled in this art can make numerous revisions and adaptations of the invention and it is intended that such revisions and adaptations which incorporate the herein disclosed principles will be included within the scope of the following claims as equivalents of the invention.

What I claim is:

1. A tool holder for tool bits having cutting surfaces comprising: a tool cutting end having a bit-receiving area formed therein; a tool bit mounted in said receiving area; movable wedge means disposed within said area and movable therein to define the operative position of said tool bit and including a locking means and a plurality of spaced locking means adapted for interlocking with a projecting portion within said area to define its position, and clamping means for holding said wedge and tool bit in their respective positions; and wherein said clamping means includes a chip breaking clamping pad having a swivable connection with said clamping means to communicate hold down force on said tool bit at its position within said seat; and including means for gripping said swivable connection to prevent angular movement of said chip breaker clamping pad from its adjusted position.

* * * * *